United States Patent
Sauter et al.

(10) Patent No.: US 10,226,981 B2
(45) Date of Patent: Mar. 12, 2019

(54) HVAC DOOR INDENTS FOR NOISE REDUCTION

(71) Applicant: DENSO International America, Inc., Southfield, MI (US)

(72) Inventors: Paul Sauter, Detroit, MI (US); Justin Black, Novi, MI (US); John Uhrick, Royal Oak, MI (US); Eric Barbier, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 142 days.

(21) Appl. No.: 14/925,408

(22) Filed: Oct. 28, 2015

(65) Prior Publication Data

US 2016/0221415 A1    Aug. 4, 2016

Related U.S. Application Data

(60) Provisional application No. 62/110,828, filed on Feb. 2, 2015.

(51) Int. Cl.
*B60H 1/00* (2006.01)
(52) U.S. Cl.
CPC ... *B60H 1/00685* (2013.01); *B60H 2001/006* (2013.01); *B60H 2001/00721* (2013.01)
(58) Field of Classification Search
CPC ................................................. B60H 1/00685
USPC ........................................................ 454/69
See application file for complete search history.

(56) References Cited

U.S. PATENT DOCUMENTS

| 5,720,657 | A | * | 2/1998 | Kamiya | ............. | B60H 1/00685 |
| | | | | | | 454/121 |
| 6,386,966 | B1 | | 5/2002 | Kuwayama et al. | | |
| 8,043,148 | B2 | | 10/2011 | Eguchi et al. | | |
| 2008/0026687 | A1 | * | 1/2008 | Maehata | ............. | B60H 1/00685 |
| | | | | | | 454/69 |
| 2008/0108293 | A1 | * | 5/2008 | Haupt | ................ | B60H 1/00685 |
| | | | | | | 454/156 |
| 2010/0139308 | A1 | | 6/2010 | Eguchi et al. | | |
| 2010/0190431 | A1 | | 7/2010 | Kurniawan et al. | | |

FOREIGN PATENT DOCUMENTS

| CN | 103062878 A | 4/2013 |
| EP | 2433825 A1 | 3/2012 |
| JP | 2006159924 A | 6/2006 |
| JP | 5101812 B2 | 12/2012 |

* cited by examiner

*Primary Examiner* — Steven B McAllister
*Assistant Examiner* — Allen Schult
(74) *Attorney, Agent, or Firm* — Harness, Dickey & Pierce, P.L.C.

(57) ABSTRACT

The present teachings provide for an HVAC assembly including a housing and a door. The housing can define a first flue. The first flue can be configured to direct a first airflow through the housing. The door can be received in the housing and can be movable between a first position and a second position. The door can have an edge and an upstream surface. The edge can form a seal with the housing when the door is in the first position. The edge can be spaced apart from the housing when the door is in the second position. The upstream surface of the door can define a plurality of channels proximate to the edge of the door.

11 Claims, 5 Drawing Sheets

HVAC DOOR INDENTS FOR NOISE REDUCTION

CROSS-REFERENCE TO RELATED APPLICATION

This application claims the benefit of U.S. Provisional Application No. 62/110,828, filed on Feb. 2, 2015, the entire disclosure of which is incorporated herein by reference.

FIELD

The present disclosure relates to a heating, ventilation, and air conditioning ("HVAC") door having indents for noise reduction.

BACKGROUND

This section provides background information related to the present disclosure which is not necessarily prior art.

Heating, ventilation, and air conditioning ("HVAC") units for vehicles generally include a housing and plurality of flues that direct air through the housing and to various components of the HVAC unit, such as different outlets or heat exchangers for example. The HVAC unit generally includes at least one door within the flues that can be moved between multiple positions to selectively control the amount of air that passes through the various components. In some intermediate positions of these doors a relatively small cross-sectional flow area between the door and the housing can be created, which can result in a relatively high velocity of the air through that area. It has been found that the passage of the air through these narrow spaces when doors are nearly closed can cause an undesirable noise, such as a whistle for example.

SUMMARY

This section provides a general summary of the disclosure, and is not a comprehensive disclosure of its full scope or all of its features.

The present teachings provide for an HVAC assembly including a housing and a door. The housing can define a first flue. The first flue can be configured to direct a first airflow through the housing. The door can be received in the housing and can be movable between a first position and a second position. The door can have an edge and an upstream surface. The edge can form a seal with the housing when the door is in the first position. The edge can be spaced apart from the housing when the door is in the second position. The upstream surface of the door can define a plurality of channels proximate to the edge of the door.

The present teachings further provide for an HVAC assembly including a housing and a door. The housing can define a first flue. The first flue can be configured to direct a first airflow through the housing and can have a sealing member. The door can be received in the housing and can be coupled to the housing for rotation about an axis between a first position and a second position relative to the housing. The door can have an edge and a wall member. The edge can form a seal with the sealing member when the door is in the first position. The edge can be spaced apart from the sealing member when the door is in the second position. The wall member can define a plurality of channels proximate to the edge of the door. The channels can be recessed from an upstream surface of the wall member and can align with the sealing member when the door is in the second position.

The present teachings further provide for an HVAC assembly including a housing and a door. The housing can define a first flue. The first flue can be configured to direct a first airflow through the housing and can have a sealing member. The door can be received in the housing and can be coupled to the housing for rotation about an axis between a first position and a second position relative to the housing. The door can have an edge and a wall member. The wall member can have a cylindrical surface that faces upstream relative to the first flue. The edge can extend radially outward from the cylindrical surface and can form a seal with the sealing member when the door is in the first position. The edge can be spaced apart from the sealing member when the door is in the second position. The wall member can define a plurality of channels proximate to the edge of the door. The channels can be recessed from the cylindrical surface of the wall member and can align with the sealing member when the door is in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
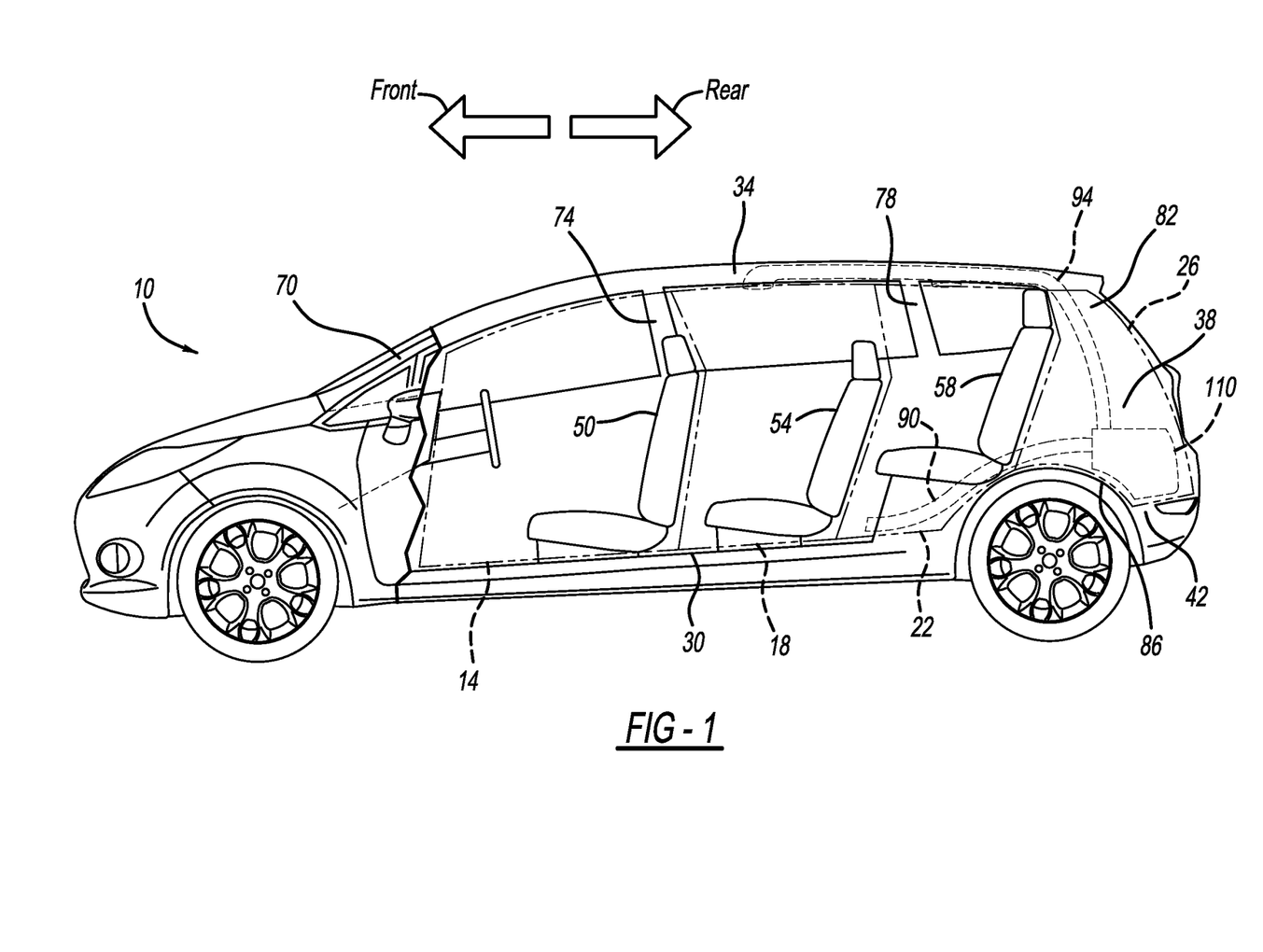
FIG. 1 is a representative vehicle including a rear heating, ventilation, and air conditioning ("HVAC") unit in accordance with the present teachings.

FIG. 1 illustrates a representative vehicle 10 which can include a front passenger area 14, a middle passenger area 18, a rear passenger area 22, and a trunk area 26. The vehicle 10 can have a floor 30, a roof or headliner 34, at least one interior trim panel 38, an exterior body 42, a set of first seats 50, a set of second seats 54, and a set of third seats 58. The vehicle 10 can further include a plurality of pillars including an A-pillar 70, B-pillar 74, a C-pillar 78, and a D-pillar 82, a set of wheel wells including rear wheel well 86, a first duct 90, a second duct 94, and a rear HVAC unit 110.

The front passenger area 14 can be located toward the front of the vehicle 10 and the first seats 50 can be located generally within the front passenger area 14. In the example provided, the front passenger area 14 can be generally between the A-pillar 70 and the B-pillar 74, though other configurations can be used. The middle passenger area 18 can be rearward of the front passenger area 14 and the second seats 54 can be generally located within the middle passenger area 18. In the example provided, the middle passenger area 18 can be generally between the B-pillar 74 and the C-pillar 78, though other configurations can be used. The rear passenger area 22 can be rearward of the middle passenger area 18 and the third seats 58 can be generally located within the rear passenger area 22. In the example provided, the rear passenger area 22 can be generally between the C-pillar 78 and the D-pillar 82, though other configurations can be used. The trunk area 26 can be rearward of the rear passenger area 22. The trunk area 26 can be generally between the third seats 58 and the D-pillar 82, though other configurations can be used. It is understood that vehicles having greater or fewer sets of seats, having greater or fewer passenger areas can be used.

The rear HVAC unit 110 can be located within the trunk area 26 generally between the trim panel 38 and the exterior body 46, though other locations can be used. The first duct 90 can be coupled to the HVAC unit 110 for fluid communication and can be configured to direct air received from the HVAC unit 110 to an area or zone of the vehicle 10. In the particular example provided, the first duct 90 directs air to a lower region of the rear passenger area 22, such as near a passenger's feet (not shown) for example. It is understood that the first duct 90 can additionally or alternatively direct air to other regions within the vehicle 10, such as to a lower region of the middle passenger area 18 for example.

The second duct 94 can be coupled to the HVAC unit 110 for fluid communication and can be configured to direct air received from the HVAC unit 110 to a different area or zone of the vehicle 10 from the first duct 90. In the particular example provided, the second duct 94 is routed within one of the pillars (e.g. C-pillar 78 or D-pillar 82) and along the headliner 34 to direct air to an upper region of the rear passenger area 22 and the middle passenger area 18. It is understood that the second duct 94 can additionally or alternatively direct air to other regions or fewer regions within the vehicle 10.

Figure 2:
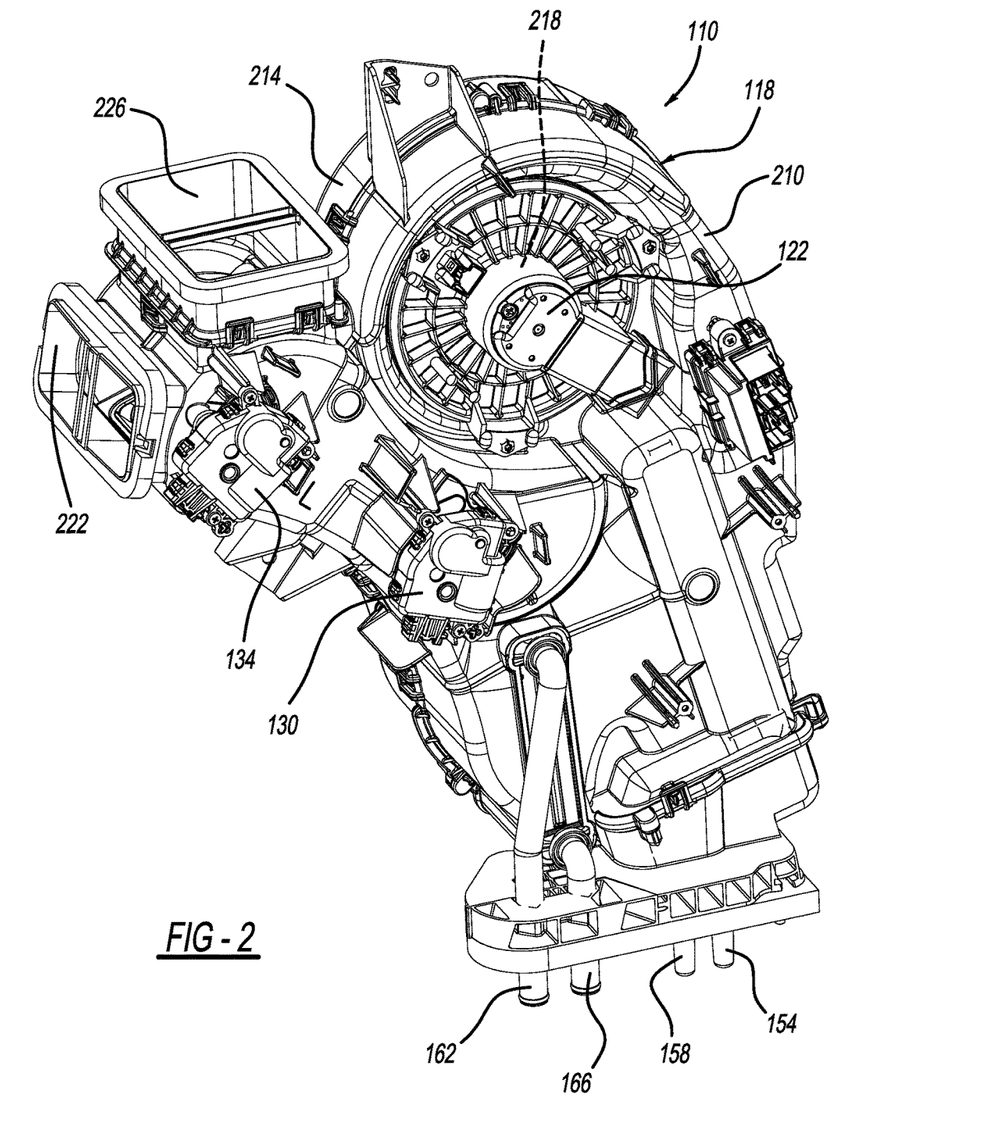
FIG. 2 is a perspective view of the rear HVAC unit of FIG. 1 illustrated in more detail.
Figure 3:
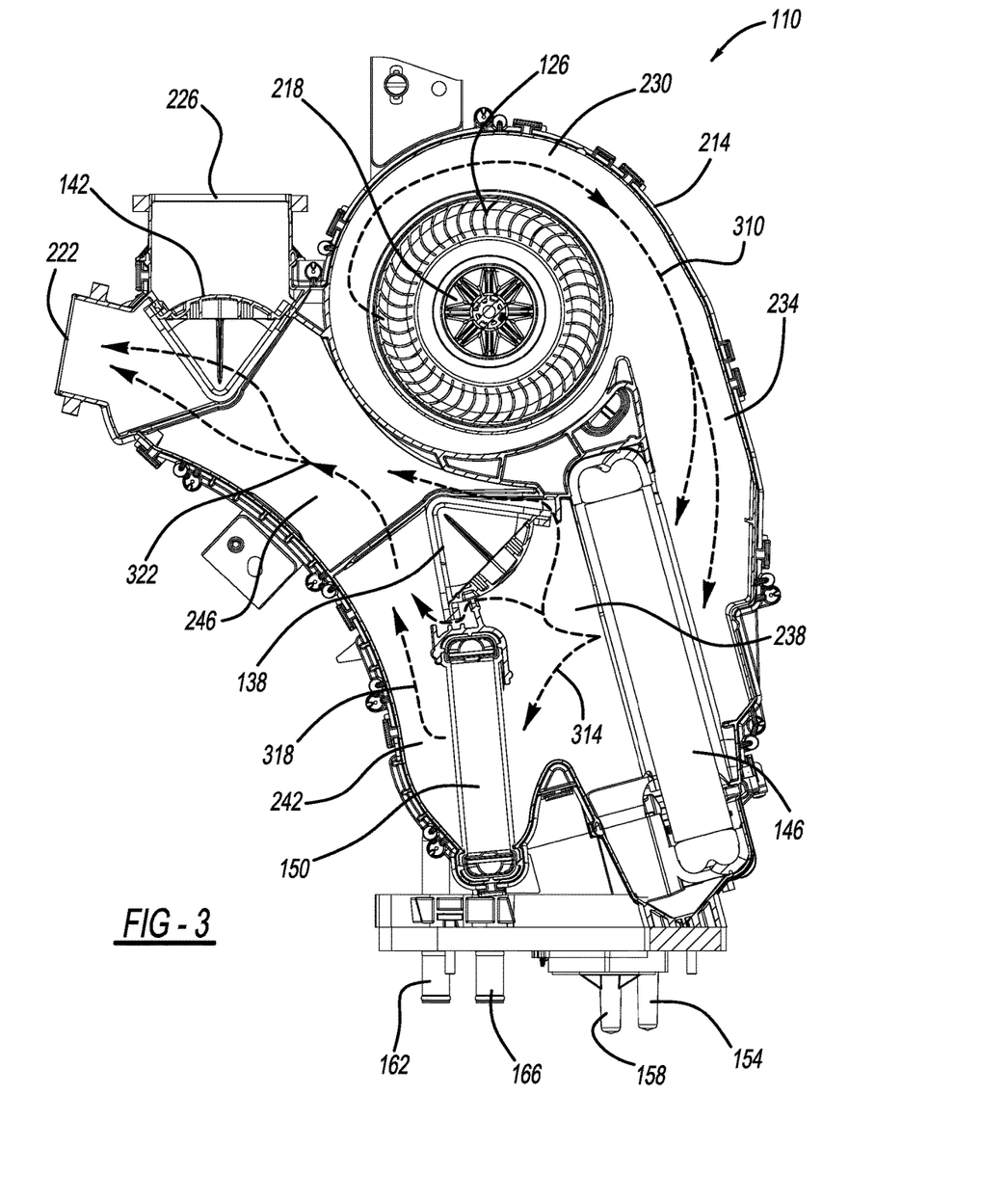
FIG. 3 is a cut-away view of the rear HVAC unit of FIG. 2 illustrating a set of flues and flue doors in accordance with the present teachings.

With additional reference to FIGS. 2 and 3, the rear HVAC unit 110 is illustrated in more detail. The rear HVAC unit 110 can include a housing 118, a first or blower motor 122, a blower fan 126, a second or blend motor 130, a third or zone motor 134, a first door or blend door 138, and a second door or zone door 142. The HVAC unit 110 can also include an evaporator 146, a heater core 150, a coolant supply line 154, a coolant return line 158, a heater supply line 162, and a heater return line 166.

The housing 118 can include a first shell 210 and a second shell 214. A first and second shell 210, 214 can define an air inlet 218, a first outlet 222, a second outlet 226, a blower cavity 230, and a plurality of internal flues including a supply flue 234, a cool flue 238, a hot flue 242, and a mixing flue 246. The first and second shells 210, 214 can be formed of a molded plastic material, such as a thermoplastic for example, and can be joined together by any suitable method, including plastic welding, or clips for example. The air inlet 218 can be configured to permit fluid communication with air located outside the housing 118, such as air within the vehicle 10 and/or air from the exterior of the vehicle 10, which can be drawn into the housing 118 through intake ducts (not shown) connected to the air inlet 218.

The air inlet 218 can be in fluid communication with the blower cavity 230. The blower fan 126 can be received in the blower cavity 230. The blower motor 122 can be received within the housing 118 between the first and second shells 210 and 214, or can be mounted exterior of the housing 118. The blower motor 122 can be drivingly coupled to the blower fan 126 to rotate the blower fan 126 within the blower cavity 230 to draw air in to the housing 118 through the air inlet 218 and into the blower cavity 230. The supply flue 234 can fluidly couple the blower cavity 230 and the evaporator 146. The blower fan 126 can be configured to blow supply air 310 from the blower cavity 230 through the supply flue 234 and through the evaporator 146.

The evaporator 146 can be received within the housing 118 such that the supply air 310 can flow through the evaporator 146 as it exits the supply flue 234. The evaporator 146 can be any suitable type of heat exchanger such as a plate-fin heat exchanger or a shell-tube heat exchanger for example, configured to remove heat from the supply air 310 as the supply air 310 passes across or through the evaporator 146. In the example provided, coolant fluid, such as a refrigerant for example, can be supplied to the evaporator 146 through the coolant supply line 154.

After absorbing heat from the supply air 310, the coolant fluid can exit the evaporator 146 through the coolant return line 158. Cool air 314 can exit the evaporator 146 into the cool flue 238. The cool flue 238 can fluidly couple the evaporator with the mixing flue 246 and the heater core 150. Depending on the position of the blend door 138, as will be described in greater detail below, some, all, or none of the cool air 314 can flow through the cool flue 238 to the mixing flue 246, and some, none, or all of the cool air 314 can flow through the heater core 150 into the hot flue 242.

The heater core 150 can be received in the housing 118 such that cool air 314 can flow through the heater core 150 as it exits the cool flue 238 and enters the hot flue 242. The heater core 150 can be any suitable type of heat exchanger, such as a plate-fin heat exchanger or a shell-tube heat exchanger for example, configured to add heat to the cool air 314 as the cool air 314 passes across or through the heater core 150. In the example provided, a heating fluid, such as a refrigerant heated by heat absorbed from the vehicle's 10 engine (not shown) for example, can be supplied to the heater core 150 through the heater supply line 162. After releasing heat from the heater fluid to the cool air 314, the heater fluid can exit the heater core 150 through the heater return line 166.

Alternatively or additionally, the heater core 150 can include an electric heating element used to heat the cool air 314 that passes through the heater core 150. Hot air 318 can exit the heater core 150 into the hot flue 242. The hot flue 242 can fluidly couple the heater core 150 to the mixing flue 246 separately from the cool flue 238. Within the mixing flue 246, cool air 314 from the cool flue 238 and hot air 318 from the hot flue 242 can mix as a flow of mixed air 322. The mixed air 322 can generally be a temperature between the temperature of the cool air 314 and the hot air 318.

The mixing flue 246 can be fluidly coupled with the first outlet 222 and the second outlet 226. Depending on the position of the zone door 142, as will be described in greater detail below, some, all, or none of the mixed air 322 can exit the housing 118 through the first outlet 222 and some, none, or all of the mixed air 322 can exit the housing 118 through the second outlet 226. The first outlet 222 can be coupled for fluid communication with the first duct 90 (FIG. 1) such that air exiting the first outlet 222 can be directed by the first duct 90 as described above. The second outlet 226 can be coupled for fluid communication with the second duct 94 (FIG. 1) such that air exiting the second outlet 226 can be directed by the second duct 94 as described above.

The blend door 138 can be disposed within the housing 118 and can be configured to move between a first position, a second position, and a plurality of intermediate positions between the first and second positions. The blend door 138 can be coupled to the housing 118 to pivot between the first, second, and intermediate positions.

In the first position, the blend door 138 can be positioned to inhibit airflow from the hot flue 242 to the mixing flue 246, such that all of the cool air 314 can flow directly from the cool flue 238 to the mixing flue 246. In this first position (i.e. full cool position) the mixed air 322 can be substantially the same temperature as the cool air 314. In the second position, the blend door 138 can be positioned to inhibit airflow from the cool flue 238 to the mixing flue 246, such that all of the cool air 314 can flow through the heater core 150 and hot flue 242 before entering the mixing flue 246. In this second position (i.e. full heat position) the mixed air 322 can be substantially the same temperature as the hot air 318. In the intermediate positions, the blend door 138 can permit various ratios of cool air 314 and hot air 318 to enter the mixing flue 246 to vary the temperature of the mixed air 322.

In this way the blend door 138 can control the temperature of the mixed air 322 by controlling the respective amounts of air that flows through the hot flue 242 and the cool flue 238. The blend motor 130 can be received within the housing 118 or can be mounted external of the housing 118 and drivingly coupled to the blend door 138. The blend motor 130 can be any suitable type of motor such as a servo motor for example. The blend motor 130 can be configured to move or rotate the blend door 138 between the first, second and intermediate positions of the blend door 138.

The zone door 142 can be disposed within the housing 118 and can be configured to move between a fourth position, a fifth position, and a plurality of intermediate positions between the fourth and fifth positions. The zone door 142 can be coupled to the housing 118 to pivot between the fourth, fifth, and intermediate positions.

In the fourth position, the zone door 142 can be positioned to inhibit airflow from the mixing flue 246 through the first outlet 222, such that all of the mixed air 322 can flow through the second outlet 226. In the fifth position, the zone door 142 can be positioned to inhibit airflow from the mixing flue 246 through the second outlet 226, such that all of the mixed air 322 can flow through the first outlet 222. In the intermediate positions, the zone door 142 can permit the mixed air 322 to flow through the first and second outlets 222, 226 at various ratios to vary the amount of airflow through the first and second outlets 222, 226.

In this way the position of the zone door 142 can control the amount of air that flows through the first and second ducts 90, 94 (FIG. 1). The zone motor 134 can be any suitable type of motor such as a servo motor for example. The zone motor 134 can be configured to move or rotate the zone door 142 between the fourth, fifth and intermediate positions of the zone door 142.

Figure 4:
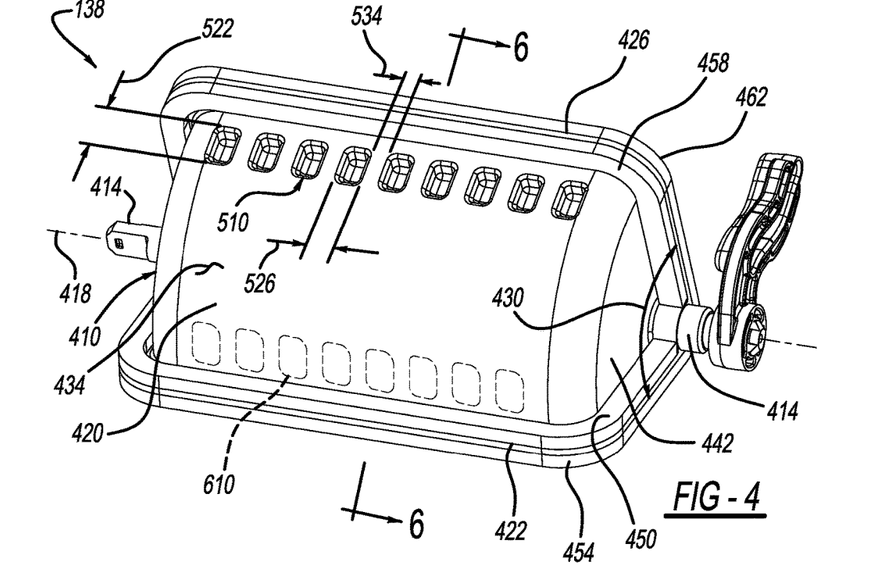
FIG. 4 is a perspective view of one of the flue doors of FIG. 3.
Figure 5:
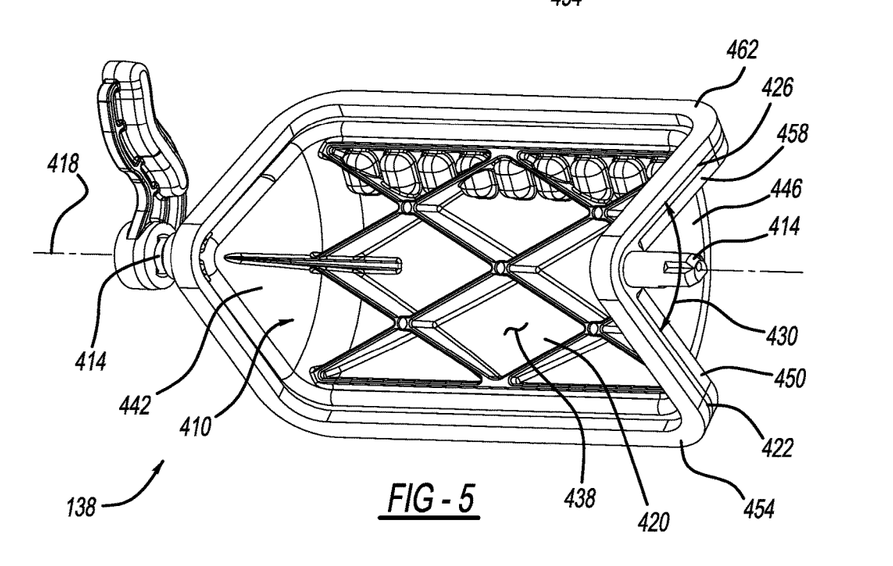
FIG. 5 is another perspective view of the flue door of FIG. 4.
Figure 6:
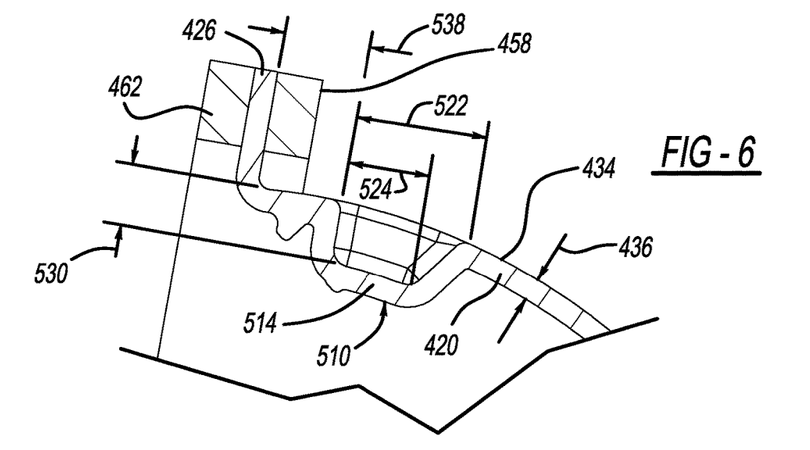
FIG. 6 is a sectional view of a portion of the flue door of FIG. 4 cut-along line 6-6.

With additional reference to FIGS. 4-6, the blend door 138, is illustrated in greater detail. While described with reference to the blend door 138, it is understood that the zone door 142 can be similarly constructed as described below with reference to the blend door 138. The blend door 138 can include a drum 410, a pair of pivot members 414 disposed about an axis 418, a first edge 422, and a second edge 426. The first and second edges 422, 426 can be coupled to the pivot members 414 generally at an angle 430 relative to each other.

The drum 410 can be a portion of a generally hollow cylindrical body including an outer wall 420, a first end wall 442, and a second end wall 446. The outer wall 420 can be centered about the axis 418 and can extend circumferentially about the axis 418 between the first and second edges 422, 426. The outer wall 420 can have an upstream surface or cylindrical outer face 434 and a downstream surface or cylindrical inner face 438 such that the outer wall 420 can generally have a wall thickness 436. The first and second end walls 442, 446 can be disposed at opposite axial ends of the outer wall 420 and can extend radially inward in a generally pie-shape toward the axis 418 and can join with the pivot members 414. The outer wall 420 and the first and second ends 442, 446 can extend circumferentially relative to the axis 418 between the first edge 422 and second edge 426 throughout the angle 430.

The outer wall 420 can generally include a plurality of channels or notches 510. The upstream surface 434 can be generally smooth with the exception of the notches 510. The notches 510 can be formed in the outer wall 420 and can be indented radially inward from the upstream surface 434. The notches 510 can protrude from the downstream surface 438 to a back wall 514 of the notches 510. The notches 510 can have a first length 522, a second length 524, a width 526, and a depth 530. Each of the notches 510 can be spaced apart by a distance 534 and the notches 510 can be spaced apart from the second edge 426 by a distance 538. The notches 510 can be spaced along the entire length of the outer wall 420. In the particular example provided, the outer wall 420 includes nine notches 510 equally spaced apart, though other configurations can be used, such as other numbers of notches 510 or spacing for example.

The first length 522 can be the distance across the notch 510 at the upstream surface 434 and generally in the circumferential direction. The second length 524 can be the distance across the back wall 514 generally in the circumferential direction. The second length 524 can be less than the first length 522 such that the notch 510 can generally taper toward the back wall 514. The width 526 can be the distance across the notch 510 at the upstream surface 434 and generally in the axial direction. The first length 522 can be greater than the width 526 such that the notches 510 can be generally rectangular in shape, though other configurations or shapes can be used. The depth 530 can be greater than the wall thickness 436. In the particular example provided, the spacing distance 534 can be less than the width 526, though other configurations can be used. The distance 538 that the notches 510 are spaced apart from the second edge 426 can be less than the first length 522.

It is understood that additional or alternative notches, such as those shown in dashed lines and indicated by reference number 610, can be included. The notches 610 can be located proximate to the first edge 422. The notches 610 can be similarly constructed as the notches 510 and can be similarly located with respect to the first edge 422 as the notches 510 are located with respect to the second edge 426.

The pivot members 414 can be fixedly coupled to the drum 410 and the first and second edges 422, 426 for common rotation about the axis 418. The pivot members 414 can extend axially outward from a respective one of the first and second end walls 442, 446. The pivot members 414 can be rotatably coupled to a respective one of the first and second shells 210, 214 of the housing 118 such that the blend door 138 can pivot about the axis 418 relative to the housing 118. One of the pivot members 414 can be drivingly coupled to the blend motor 130 such that operation of the blend motor 130 can rotate the pivot member 414 and thus rotate the blend door 138.

The first edge 422 can be a continuous edge that can extend radially outward of the upstream surface 434 along the entire length of the outer wall 420 and can extend axially outward from the first and second end walls 442, 446 along the entire radius of the first and second end walls 442, 446 to the pivot members 414. The second edge 426 can be a continuous edge that can extend radially outward of the upstream surface 434 along the entire length of the outer wall 420 and can extend axially outward from the first and second end walls 442, 446 along the entire radius of the first and second end walls 442, 446 to the pivot members 414.

The blend door 138 can also include a first inner seal 450, a first outer seal 454, a second inner seal 458 and a second outer seal 462. The first inner seal 450, first outer seal 454, second inner seal 458 and second outer seal 462 can be formed of a resilient material such as a foam material for example, though other types of materials can be used such as thermoplastic or rubber for example. The first and second inner seals 450 458 can be disposed on an interior of the angle 430. The first and second outer seals 454 462 can be disposed on an exterior of the angle 430.

The first inner seal 450 and first outer seal 454 can generally surround the first edge 422. The first inner seal 450 can generally extend from the pivot member 414 along the first edge 422 radially outward along the perimeter of the first and second end walls 442, 446 and the first edge 422, and can extend axially along the entire length of the upstream surface 434. The first outer seal 454 can generally extend from the pivot member 414 along the first edge 422 radially outward along the perimeter of the first edge 422 and axially along the entire length of the first edge 422.

The second inner seal 458 and the second outer seal 462 can generally surround the second edge 426. The second inner seal 458 can generally extend from the pivot member 414 along the second edge 426 radially outward along the perimeter of the first and second end walls 442, 446 and the second edge 426, and can extend axially along the entire length of the upstream surface 434. The second outer seal 462 can generally extend from the pivot member 414 along the first edge 422 radially outward along the perimeter of the second edge 426 and axially along the entire length of the second edge 426. The first and second outer seals 454, 462 can wrap around the pivot member 414 and be coupled together. In the example provided, the first and second outer seals 454, 462 are a singular piece of material though, other configurations can be used.

Figure 7:
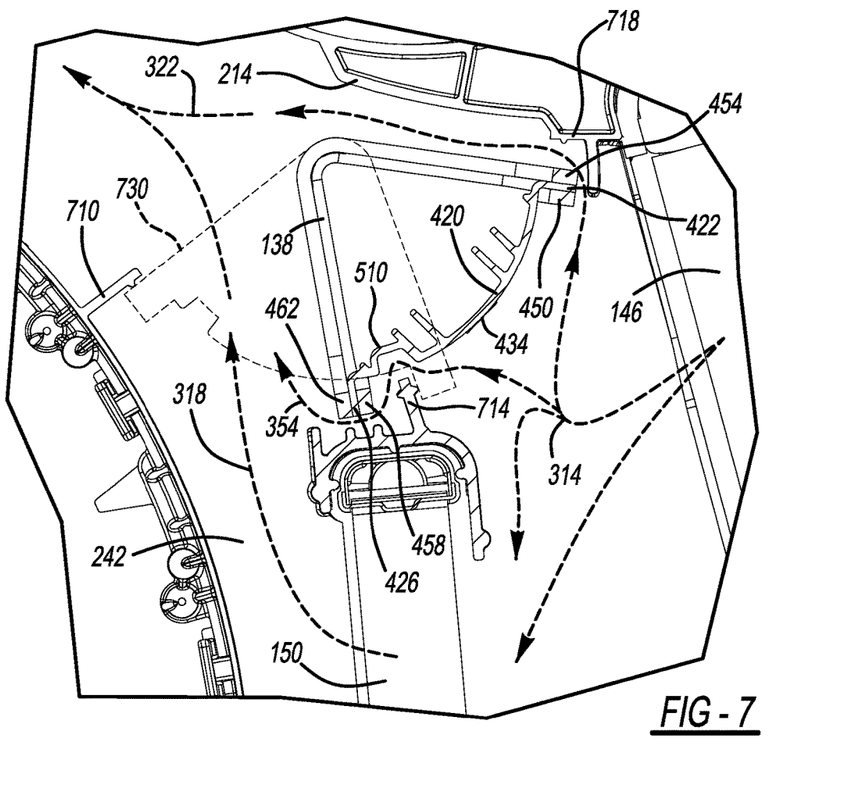
FIG. 7 is a sectional view a portion of the rear HVAC unit of FIG. 2 illustrating airflow around the flue door of FIG. 4.

With additional reference to FIG. 7, a sectional view of a portion of the HVAC unit 110 is shown in greater detail and with the blend door in one example of an intermediate position. The housing 118 can further include a first sealing member 710, a second sealing member 714, and a third sealing member 418. The first, second, and third sealing members 710, 714, 718 can be unitarily formed with the first and second shells 210, 214. The first and second sealing member 710, 714 can define an exit of the hot flue 242 that can fluidly couple the hot flue 242 with the mixing flue 246. The second and third sealing members 714, 718 can define an exit of the cool flue 238 that can fluidly couple the cool flue 238 directly with the mixing flue 246.

When the blend door 138 is positioned in the first position, as described above and shown in dashed lines indicated by reference numeral 730, the second outer seal 462 can contact and seal with the first sealing member 710, while the first inner seal 450 can contact and seal with the second sealing member 714. In the first position, the drum 410 can block air from exiting the hot flue 242 to the mixing flue 246, which can effectively inhibit flow of cool air 314 from flowing through the heater core 150. Thus, in the first position, substantially all of the cool air 314 can flow through the cool flue 238 directly to the mixing flue 246.

When the blend door 138 is positioned in the second position, as described above but not specifically shown, the second inner seal 458 can contact and seal with the second sealing member 714, while the first outer seal 454 can contact and seal with the third sealing member 718. In the second position, the drum 410 can block air from exiting the cool flue 238 directly to the mixing flue 246. Thus, in the second position, substantially all of the cool air 314 can flow through the heater core 150 and the hot flue 242 before entering the mixing flue 246.

In the particular intermediate position shown in solid lines in FIG. 7, the cool flue 238 is nearly closed to the mixing flue 246 (i.e. nearly in the second position) and the majority of the cool air 314 can flow through the heater core 150 and hot flue 242. In this intermediate position, the hot air 318 is the majority of the flow entering the mixing flue 246 and the cool air 314 that passes through the cool flue 238 can constitute a secondary flow 354 that can enter the mixing flue 246 to mix with the hot air 318. The relatively small space between the blend door 138 and the second and third sealing members 714, 718, can generally result in a relatively high velocity of the secondary flow 354. It has been found that the passage of the secondary flow 354 between the blend door 138 and the second sealing member 714 at the relatively high velocity can cause a whistling noise in HVAC units 110 that have flue doors of a typical construction (not specifically shown) without the notches 510.

The notches 510 of the blend door 138 can break up the flow of cool air 314 before it enters the relatively narrow space between the blend door 138 and the second sealing member 714. The first length 522 of the notches 510 can be greater than the width of the sealing member 714 proximate to the upstream surface 434 such that the secondary flow 354 can flow into the notches 510 and around the sealing member 714 when the notches are aligned with the sealing member 714. The notches 510 can cause turbulence in the cool air 314 and secondary flow 354 that can reduce the velocity of the secondary flow 354 and reduce or eliminate such whistling noises. The notches 510 can also increase the space between the upstream surface 434 and the second sealing member 714 to reduce the velocity of the secondary flow 354.

It is understood that the notches 610 (FIG. 4) can be included to reduce or eliminate whistling of secondary flow 354 between the blend door 138 and the third sealing member 718. It is also understood that the notches 510 and 610 can similarly reduce whistling noise associated with the blend door 138 being in other similar intermediate positions, such as when the blend door 138 is nearly in the first position to almost completely block flow through the hot flue 242 for example. Furthermore, it is understood that other doors in the HVAC unit 110, such as the zone door 142 for example, can be constructed similarly to eliminate whistling of air around those doors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An HVAC assembly comprising:
   a housing defining a first flue, the first flue being configured to direct a first airflow through the housing;
   a door received in the housing and movable between a first position and a second position, the door having an edge and an upstream surface, the edge forming a seal with the housing when the door is in the first position, and the edge being spaced apart from the housing when the door is in the second position, the door further having a pair of opposing end walls; and
   a plurality of channels defined by the upstream surface of the door proximate to the edge of the door and spaced apart from each one of the pair of opposing end walls, wherein:
   the plurality of channels are aligned axially along the upstream surface;
   each of the plurality of channels are equally spaced apart along a length of the upstream surface, and include a back wall keeping air from flowing through to an inside of the upstream surface;
   the channels each have a first length in a circumferential direction at the upstream surface and a width in an axial direction, the first length in the circumferential direction being longer than the width in the axial direction;
   the channels are spaced apart from the edge of the door by a distance that is less than the first length in the circumferential direction; and
   the channels each have a back wall that is recessed from the upstream surface, the back wall has a second length in the circumferential direction that is less than the first length.

2. The HVAC assembly of claim 1, wherein the door is coupled to the housing for rotation between the first and second positions about an axis.

3. The HVAC assembly of claim 2, wherein the upstream surface has a cylindrical shape.

4. The HVAC assembly of claim 2, wherein the edge extends radially outward from the upstream surface.

5. The HVAC assembly of claim 1, wherein the door has a wall thickness at the upstream surface and the channels protrude downstream from the upstream surface a depth that is greater than the wall thickness.

6. The HVAC assembly of claim 1, wherein the housing further defines a second flue, the second flue being configured to direct a second airflow through the housing separate from the first airflow, wherein the door is movable between the first and second positions and a third position, the door inhibiting the second airflow when in the third position and permitting the second airflow when in the first and second positions.

7. The HVAC assembly of claim 6, further comprising a heating device received in the housing, the housing defining a third flue in fluid communication with the first and second flues, the second flue being fluidly coupled to the heating device, the door inhibiting fluid communication of the second airflow between the second and third flues while permitting fluid communication of the first airflow between the first and third flues when in the third position, and to permit fluid communication of the second airflow between the second and third flues while inhibiting fluid communication of the first airflow between the first and third flues when in the first position.

8. An HVAC assembly comprising:
a housing defining a first flue, the first flue being configured to direct a first airflow through the housing and having a sealing member;
a door received in the housing and coupled to the housing for rotation about an axis between a first position and a second position relative to the housing, the door having an edge and a wall member, the edge forming a seal with the sealing member when the door is in the first position, and the edge being spaced apart from the sealing member when the door is in the second position, the door further having a pair of opposing end walls; and
a plurality of channels defined by the wall member proximate to the edge of the door and spaced apart from each one of the pair of opposing end walls, the plurality of channels being recessed from an upstream surface of the wall member and aligning with the sealing member when the door is in the second position, wherein:
the plurality of channels are aligned axially along the upstream surface;
each of the plurality of channels are equally spaced apart along a length of the upstream surface of the wall member, and include a back wall keeping air from flowing through to an inside of the upstream surface;
the channels each have a first length in a circumferential direction at the upstream surface and a width in an axial direction, the first length in the circumferential direction being longer than the width in the axial direction;
the channels are spaced apart from the edge of the door by a distance that is less than the first length in the circumferential direction; and
the channels each have a back wall that is recessed from the upstream surface, the back wall has a second length in the circumferential direction that is less than the first length.

9. The HVAC assembly of claim 8, wherein the wall member has a cylindrical shape.

10. The HVAC assembly of claim 8, wherein the edge extends radially outward from the upstream surface.

11. An HVAC assembly comprising:
a housing defining a first flue, the first flue being configured to direct a first airflow through the housing and having a sealing member;
a door received in the housing and coupled to the housing for rotation about an axis between a first position and a second position relative to the housing, the door having an edge and a wall member, the wall member having a cylindrical surface that faces upstream relative to the first flue, the edge extending radially outward from the cylindrical surface of the wall member and forming a seal with the sealing member when the door is in the first position, and the edge being spaced apart from the sealing member when the door is in the second position, the door further having a pair of opposing end walls; and
a plurality of channels defined by the wall member proximate to the edge of the door and spaced apart from each one of the pair of opposing end walls, the plurality of channels being recessed from the cylindrical surface of the wall member and aligning with the sealing member when the door is in the second position, wherein:
the plurality of channels are aligned axially along the upstream surface;
each of the plurality of channels are equally spaced apart along a length of the upstream surface of the wall member, and include a back wall keeping air from flowing through to an inside of the upstream surface;
the channels each have a first length in a circumferential direction at the upstream surface and a width in an axial direction, the first length in the circumferential direction being longer than the width in the axial direction;
the channels are spaced apart from the edge of the door by a distance that is less than the first length in the circumferential direction; and
the channels each have a back wall that is recessed from the upstream surface, the back wall has a second length in the circumferential direction that is less than the first length.

* * * * *